June 1, 1965 J. LONG 3,187,243
MOTOR ACCELERATION CONTROL FOR A TENSIONING SYSTEM
Original Filed April 24, 1961 3 Sheets-Sheet 1

INVENTOR.
JAMES LONG
BY
Robert H. Montgomery
ATTORNEY

INVENTOR.
JAMES LONG
BY Robert H. Montgomery
ATTORNEY

United States Patent Office 3,187,243
Patented June 1, 1965

3,187,243
MOTOR ACCELERATION CONTROL FOR A
TENSIONING SYSTEM
James Long, Erie, Pa., assignor to General Electric
Company, a corporation of New York
Continuation of application Ser. No. 105,064, Apr. 24,
1961. This application Dec. 5, 1962, Ser. No. 243,204
11 Claims. (Cl. 318—6)

This invention relates to an improved system for providing an acceleration control signal for electric drives, and more particularly relates to a system for providing an acceleration control signal for a plurality of coordinated electric drives.

This application is a continuation of the original application, Serial Number 105,064, filed April 24, 1961 by James Long, now abandoned, and assigned to the assignee of the present application.

To accelerate an object from rest or to another speed, accelerating energy must be applied to such object. The period of time that the accelerating energy or force is applied to the object, as well as the magnitude thereof, determines the interval of time required to reach a selected speed. When an inertial object is accelerated, reactive forces are produced which oppose the acceleration, and therefore, in acceleration or velocity control systems it is the usual practice to utilize a control signal to produce a change of speed in a controlled moving inertial object which varies linearly with time. When acceleration or change of speed of an object is constant, the reactive forces acting upon the accelerated inertial object are constant (assuming no change in mass of the object) and usually present no serious problem. However, even though constant accelerating forces applied to an inertial object usually present no problem once the object is accelerating at a constant rate, application and removal of accelerating forces may cause problems if not properly applied or removed. A common example of uncontrolled or careless application of accelerating force is the snapping effect on the head and neck of a passenger in an automobile which is abruptly accelerated or braked (negative acceleration).

In industrial applications where sheet or strip material is processed through roller stations, particularly where material is unwound from one reel onto another as it passes through the processing line, or where the material must be stopped to have processing operations performed thereon and then restarted, acceleration and deceleration of the line must be controlled, and for economy of operation should be rapid.

Such processing lines may comprise a plurality of operating stations where rollers perform a defined operation on the material being processed. Each roller station is usually driven by an electric drive which comprises a dynamoelectric machine and associated control circuitry for regulating an output characteristic of the machine. It is important that the speed of each motor be coordinated so that no loops develop in the material being processed, or that the strip not be overtensioned. Since each machine is driving the rollers of a rolling station which place large inertial loads of various magnitudes on each machine, coordination of acceleration of the rollers becomes critical.

The large inertia of the rollers resist quick response to rapid application or removal of accelerating energy thereto, and it is therefore difficult to quickly and smoothly accelerate and coordinate acceleration of a plurality of roller stations.

Accordingly, it is an object of this invention to provide an improved acceleration control system to accurately coordinate changes in speeds of a plurality of coordinated electrical drives.

It is another object of this invention to provide an improved acceleration control system for an electric drive which smoothly controls the application and removal of accelerating energy to the drive motor and loads driven thereby.

It is a further object of the invention to provide an improved acceleration control system for a plurality of related electric drives which controls application of accelerating energy applied thereto in such manner as to accurately coordinate acceleration of said plurality of drives smoothly and rapidly.

It is a still further object of the invention to provide an improved acceleration control system to coordinate acceleration of a plurality of electric drives from a master control.

The novel features of the invention are defined with particularity in the appended claims. However, it is believed the invention, together with further objects and advantages thereof, may be more fully appreciated by reference to the following description and drawings of embodiments of the invention, examples of its useful environment and typical prior art structures which may optimumly be replaced by or incorporated in the invention.

Figure 1:
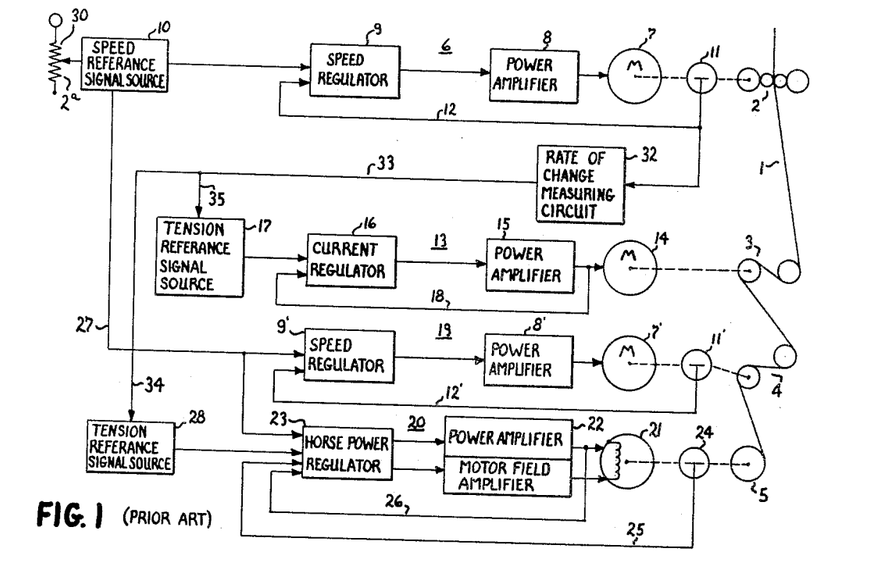
FIG. 1 illustrates partially in block form a representative roller-driven strip material process line.

In order to best explain the invention, an example of the environment in which the invention may be used, plus a typical example of prior art acceleration controls, will first be given. FIG. 1 illustrates in block form a portion of a continuous sheet material processing line driven and operated upon by a plurality of electrical drives. The system illustrated in FIG. 1, as well as the components thereof, are arranged for purposes of introduction and explanation and do not represent a particular processing system or a particular arrangement of elements thereof. The sheet material 1, which may be plastic paper, metal, etc., passes through a main rolling mill 2, which may be designed to reduce the thickness of the sheet 1, a tensioning bridle 3, cooling rollers 4, and is wound on a center driven reel 5. Each of the rolling and reeling stations 2 through 5 is driven by a regulated electrical drive. The rolling mill 2 is driven by a speed regulated drive 6 which comprises a dynamoelectric machine such as a direct current motor 7, a power amplifier 8 for supplying electrical energy to the motor 7, and a speed regulator 9, which regulates the power output of the power amplifier 8 to the motor 7. The speed regulator 9 in the illustration is a preamplifier which compares a speed reference signal provided by a line speed reference signal source 10, and a speed feedback signal indicative of motor speed, and hence mill speed, which in the illustration is derived from a tachometer 11 and fed back over line 12 to the input of speed regulator 9 together with the speed reference signal. Where direct current motors are used as driving elements, the speed feedback signal may be derived from the counter electromotive force (E.M.F.) of the motor. The comparison of the speed reference and speed feedback signals provides a speed error signal which causes the speed of motor 7 to be regulated to a predetermined value. The tension bridle is driven by an electrical drive 13 which is regulated to produce a constant torque output to maintain constant tension in the strip material 1 as it is drawn from the mill 2. The electrical drive 13 comprises a motor 14, a power amplifier 15, and a torque or current regulator 16, which is provided a tension reference signal from tension reference signal source 17. To regulate tension in the sheet material 1, the torque of the motor 14 is regulated by feedback from the output of power amplifier 15 over line 18. A signal indicative of motor torque, i.e., motor armature current, is compared in regulator 16 with the tension reference signal, and such comparison produces a tension error signal which regulates the torque of motor 14, and hence the tension, since the roller load on motor 14 is of non-varying diameter. The cooling rollers 4 are driven by electrical drive 19, which is generally similar to drive 6, and therefore like elements comprising the drive bear like numerals primed. However, in practice the elements of the drive 19 will not necessarily be identical to those of drive 6, inasmuch as the loads driven thereby will probably be different in magnitude. Therefore, the motor 7' may have a different horsepower rating than motor 7, and the other elements of the drive may vary correspondingly. The sheet material processing line is terminated on center driven reel 5 which is driven by electrical drive 20. This drive may comprise a dynamoelectric machine such as motor 21, power amplifier and motor field amplifier 22 and tension or horsepower regulator 23. Inasmuch as the reel 5 must take up the sheet material 1 at a constant linear speed while maintaining constant tension in the material 1, both the speed and torque of motor 21 must be regulated in accordance with reel build-up. Therefore, reel speed deriving means such as tachometer 24, driven by the motor, supplies a reel speed signal over line 25 to the input of regulator 23, and assuming that the motor 21 is of the direct current type, a signal indicative of motor armature current, and hence motor torque, is fed back over line 26 to the input of regulator 23. Also applied to the input of regulator 23 is a line speed signal which is indicated as derived from speed reference source 10 over line 27. A tension reference signal is also applied to regulator 23 from tension reference signal source 28, inasmuch as the tension exerted on the strip 1 by the reel 5 must remain constant as reel speed changes, and motor torque must increase with reel build-up to maintain a constant pull on sheet material 1. The speed-torque characteristic of motor 21 is regulated to vary as a hyperbolic function with reel build-up. Hence, the regulated output quantity of drive 20 is horsepower which maintains constant pull or tension on the strip 1.

When it is desired to start, stop or in any direction change the speed of continuous sheet material 1, the master speed reference signal is varied, as shown in the illustration, by varying the position of arm 29 of potentiometer 30, which is connected to a suitable source of signal voltage, not shown. The potentiometer 30 provides a line velocity setting means and may be calibrated in appropriate units of speed. Assume that it is desired to accelerate the continuous sheet material 1. The signal input to master speed reference source 10 is increased. This causes the speed regulator 9, in response to the new speed reference signal, to cause power amplifier 8 to supply additional electrical energy to motor 7 to accelerate motor 7, and hence mill 2, to the new speed specified by the new reference signal. The new speed reference signal is also applied over line 27 and to the input of speed regulated drive 19, and generally speaking, little problem will be involved in coordinating the acceleration of motor 7' with that of motor 7. However, the motor output quantity which is regulated by drives 13 and 20 is not speed but torque and horsepower. To accelerate these loads, additional energy must be applied thereto. Therefore, the rate of acceleration of the load on electrical drive 6 is measured by measuring the change in speed of the output of tachometer 11 by provision of a rate of change-measuring circuit 32. The rate-measuring circuit 32, generally referred to as an inertia compensation circuit, senses changes in the output voltage of tachometer 11 and supplies a signal in response thereto over lines 33, 34 and 35 to the tension reference signal sources of electrical drives 13 and 20 to increase the reference signal indicative of the quantity to be regulated by each of the drives 13 and 20, to cause the amplifiers 15 and 22 to supply accelerating energy to the respective machines in addition to the energy supplied to regulate the predetermined motor characteristic. Dynamoelectric machines 14 and 21 are thus caused to accelerate toward the newly set speed of motor 7. Therefore, the drive 6 is spoken of as the master drive, and the drives 13, 19 and 20 are follower drives in that they follow the lead of drive 6. The rate of change-measuring circuit 32 basically comprises a resistance-capacitance in series across the speed indicative voltage source represented by tachometer 11. A schematic representation of a typical inertial compensation circuit may be found in U.S. Patent 2,943,809.

An inherent problem presented by this type of master-follower drive arrangement is that each drive has time constants which present time delays to signal changes and the regulator of each electrical drive will have different time constants. Also, each drive will have varying inertial loads. Therefore, the drives 13 and 20, and perhaps drive 19, will lag behind drive 6 in supplying sufficient energy to their respective dynamoelectric machines to accelerate to the new speed of drive 6. Another problem that may be presented is that the inertia compensation signal derived from circuit 32 may be inaccurate (have a time constant of its own) and also cause an initial error in accelerating the drives with respect to line speed, and a similar but opposite error at the completion of the line speed change.

Figure 2:
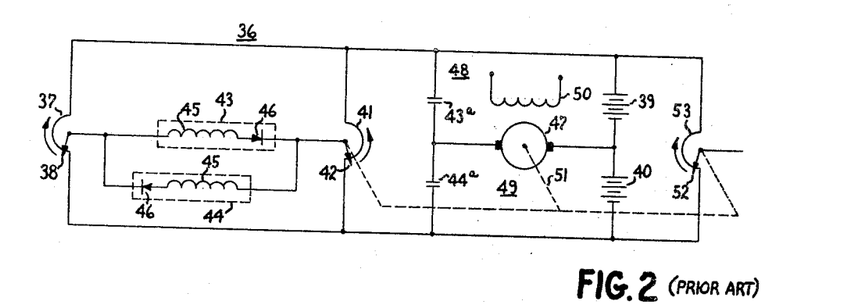
FIG. 2 illustrates a typical prior art acceleration control circuit for accelerating one or a plurality of electric drives.
Figure 3:
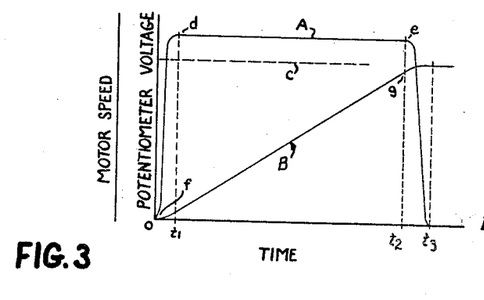
FIG. 3 graphically illustrates characteristics of the circuit of FIG. 2.

Reference is now made to FIG. 2, which illustrates a typical speed reference and acceleration control network 36, which may correspond to the master speed setting network 10 and potentiometer 30 of FIG. 1. FIG. 3 graphically illustrates characteristics of this network. The network 36 comprises a potentiometer 37 having a movable arm 38 thereon designed to pick off a selectable voltage from the potentiometer. The potentiometer 37 corresponds to potentiometer 30 of FIG. 1. The potentiometer 37 is connected across a voltage source, which for purposes of illustration is shown as batteries 39 and 40. Also connected across batteries 39 and 40 is a second potentiometer 41 having contact arm 42. The potentiometer 41 is preferably of the same resistance value as potentiometer 37. The contact arms 38 and 42 are connected through suitable current-sensing means such as oppositely polarized relays 43 and 44, each represented by a solenoid coil 45 and diode 46. The polarized relays will sense differences in voltage between the potentiometer arms 38 and 42 and the relays 43 and 44 will pick up their controlled contacts 43a and 44a respectively when energized to cause a motor 47 to be energized to drive arm 42 into coincidence with arm 38. Motor 47 is connected between contacts 43a and 44a and between batteries 39 and 40. It will be seen that the motor armature circuit is common to the circuit loop 48 containing battery 39 and contact 43a and circuit loop 49 containing battery 40 and contact 44a. The motor 47 is of a common type well known to those skilled in the art, designed to move the contact arm of a potentiometer when energized. These small motors have a separately excited field 50, and usually have their shaft 51 connected through a gear train, not shown, to the arm of one or more potentiometers adapted to be driven thereby, and may be referred to as potentiometer motors. The operation of circuit 36 is readily understandable. If arm 38 of potentiometer 37 is moved in a clockwise direction to increase the line velocity setting voltage at arm 38, the potential at arm 38 will be greater than the potential at arm 42, and therefore a current will flow through coil 45 of relay 43. This will cause contact 43a to be picked up. When contact 43a is closed, circuit loop 48 is completed and the armature of motor 47 is placed across battery 39. This rapid application of voltage across motor 47 accelerates the shaft 51 of motor 47 very rapidly, inasmuch as current is limited only by motor armature resistance, to a value determined by the voltage of battery 39, as shown by curve A in FIG. 3, which represents a plot of motor speed versus time. It is to be understood that the curves of FIG. 3 are merely for purposes of explanation and do not represent actual data.

In FIG. 3, it may be seen that the motor speed increases to substantially top speed, point d, in time $t_1$, and then runs at substantially constant speed to time $t_2$, point e. The difference in pick up and drop out currents of the relays provide a dead band which allows the motor armature circuit to open before the motor shaft 51 drives arm 42 past the position on potentiometer corresponding to the position of arm 38 on potentiometer 37 and thus avoid overshoot of arm 42. The motor shaft 51 then rapidly decelerates from time $t_2$ to zero speed at time $t_3$ due to the friction load of potentiometers and gears. The curve B is a relative plot of change of position of the arm 42 on potentiometer 41 with respect to time as arm 42 is driven by shaft 51. Curve C in dashed line represents the voltage setting of arm 38 indicative of a selected line speed.

Arm 52 of potentiometer 53, illustrated as connected across a voltage source provided by batteries 39 and 40, is also driven by shaft 51, and its change of position and the instantaneous voltage thereat is also represented by curve B, FIG. 3. The voltage change at arm 52 is then utilized as an acceleration control signal to be applied to the speed-regulating drives 6 and 19 to accelerate the motors 7 and 7' and the respective loads thereon. The increase in the speed of mill 2 in response to the accelerating signal will cause rate circuit 32 to generate an output signal which is the differential of the increase in speed. At this point it should be noted that curve B is the integral of curve A; therefore the output of rate circuit 32, which is essentialy a differentiator, is generally the same as curve A, but with delayed leading and trailing edges, caused by the rate circuit 32. In some applications the rate circuit 32 may be eliminated and the inertia compensation signal derived from the armature voltage or counter E.M.F. of motor 47. The inertia compensation signal is then applied to tension reference circuits 17 and 28 to cause an increase in the energy supplied to motors 14 and 21 to provide accelerating energy thereto.

The substantially step function inertia compensation signal will be further time delayed by time constants inherent in regulators 16 and 23, and the increase in torque at the motors 14 and 21 will further lag the accelerating energy applied to motor 7. Referring to FIG. 3, curve B, which represents the accelerating control signal is seen to have very rapid rate changes in very short time intervals, as indicated at f and g. These rapid changes in the acceleration control signal, particularly in short intervals, cannot be accurately followed by the rotating equipment due to the inertia thereof and the time constants of the regulating circuits. The delays present in the inertia compensation signal and the time constants of the regulators to which it is supplied prolong the time required to apply accelerating energy to the follower drive motors. Delays of accelerating energy during any portion of a speed change will show up as a loss of tension in the strip material at roller stations 3 and 5, and a speed error in roller stations 2 and 4 of FIG. 1.

In accordance with this invention, circuit means may be provided which generate a controlled accelerating signal that controls changes in the rate of application and removal of accelerating energy at a slow predetermined rate, and which has initiating and terminating portions having substantially zero slope with respect to time. Acceleration control circuits constructed in accordance with the invention also have provision for supplying a ramp function inertia compensation signal to smoothly apply accelerating energy to electric drive regulators other than of the speed-regulating type.

Figure 4:
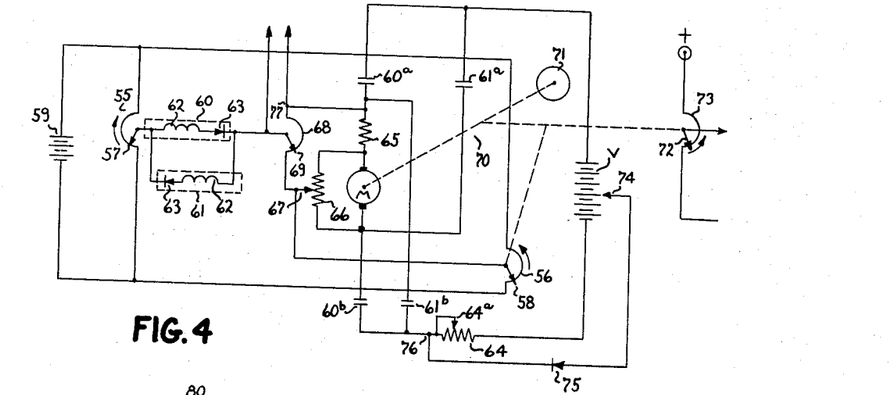
FIG. 4 illustrates an acceleration control circuit embodying the invention.

FIG. 4 illustrates an application of the invention in a motor-operated potentiometer type acceleration control circuit. Potentiometers 55 and 56, having contact arms 57 and 58 respectively, are connected across voltage source 59. Relays 60 and 61, illustrated as comprising solenoid coil 62 and rectifier 63, are provided to sense voltage differences between arms 57 and 58, and operate their respective contacts 60a and 60b; and 61a and 61b to cause arm 58 to be moved to a point of equal voltage to arm 57. Relays 60 and 61 control contacts 60a, 60b and 61a, 61b respectively. Motor M may be placed in circuit with voltage source V either through contacts 60a and 60b, or 61a and 61b, dependent on relay 60 or 61 sensing a difference in potential between potentiometer arms 57 and 58. The circuit of FIG. 4 thus far described is similar to that of FIG. 2. However, in FIG. 4 I have arranged the motor M to be energized from a constant current source illustrated as a large resistance 64 in series with a source V of high voltage. The resistance 64 is very much larger than other resistances in the motor circuit, and therefore when the motor circuit is closed the motor M will be supplied a substantially constant current. A motor speed-measuring circuit is also provided which comprises current-measuring resistor 65 in series with motor M and a potentiometer 66 having contact arms 67 connected across the motor armature. By subtracting the voltage drop across the resistor 65 from the motor armature voltage, the motor counter E.M.F. which is proportional to motor speed may be measured across potentiometer 68 having contact arm 69. Since motor current is substantially constant, the motor speed could also be measured direct from armature voltage with but little sacrifice in accuracy. The motor shaft 70 which drives contact arm 58 has placed thereon an inertial load 71 of such selected magnitude that it is the primary factor in absorbing motor torque (as compared to motor losses and potentiometer friction loading).

Assume now that arm 57 of potentiometer 55 is moved clockwise to a higher voltage point on potentiometer 55 than arm 58 on potentiometer 56 to indicate that a processing line is to be accelerated to a speed corresponding to the new setting of arm 57. Relay 60 will be energized, contacts 60a and 60b will be picked up to close the motor circuit, and motor M will accelerate to drive arm 58 toward a voltage equal to the voltage at arm 57. It will be noted that shaft 70 also drives arm 72 of potentiometer 73 towards a higher voltage setting. The potentiometer 73 connected to a voltage source, not shown, represents the output speed reference signal source 10 of FIG. 1. The motion and velocity of 72 will follow that of arm 58.

Figures 5, 6:
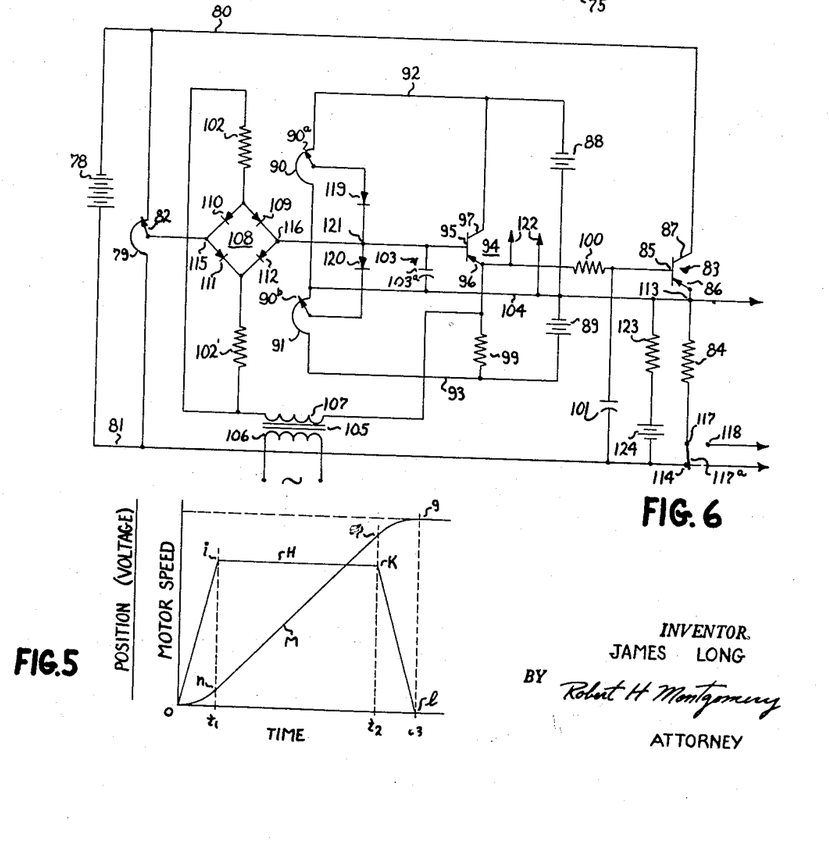
FIG. 5 graphically illustrates characteristics of an acceleration control system embodying the present invention.
FIG. 6 illustrates another acceleration control circuit embodying the invention.

When the motor M is supplied a constant current, a constant torque ($T=K\phi I$) is impressed on shaft 70 and the motor shaft 70 accelerates at a constant rate, as illustrated by curve H, segment Oi, FIG. 5. Since the motor torque T equals the product of the moment of inertia J, and the angular acceleration $\alpha$ ($T=J\alpha$), the rate of acceleration of motor shaft 70 is determined by the mass of inertial load 71 and motor torque applied thereto, and therefore the slope of segment Oi, FIG. 5, is determined by the mass of inertial load 71 and the motor torque. The mass of the inertial load 71 and maximum motor torque determines the maximum rate of acceleration of motor shaft 70. To provide an adjustment of the motor acceleration such that the acceleration may be decreased, resistor 64 is supplied with a slider 64a, increasing the amount of resistance, which decreases the armature current and hence the motor torque. An additional variable adjustment comprising the variable contact 74 on voltage source V and unidirectional conducting device 75 connected thereto, and to point 76 in the motor circuit, is also provided. It will be seen that this establishes a biasing voltage across resistor 64 and the negative terminal of the voltage source which will limit the armature voltage, and hence the armature current, and therefore accelerating torque supplied to the armature of motor M. The motor voltage biasing control will also determine the top speed of the motor since the motor speed is dependent on armature voltage. When the motor reaches top speed, as indicated at point $i$, FIG. 5, it proceeds to drive shaft 70 at maximum speed until time $t_2$, point K. In order to prevent the motor shaft 70 from driving arm 58 past a point on potentiometer 56 corresponding to the potential at arm 57 on potentiometer 55, means are provided to sense approach of arm 58 to the point desired on potentiometer 56. This is accomplished by placing the motor speed voltage measured across potentiometer 68 in series with potentiometer arms 57 and 58. Therefore, when the sum of the potential at arm 58 and the voltage across potentiometer 68 at the arm 69 thereof equals the voltage at arm 57, relay 60 becomes deenergized and causes contacts 60a and 60b to drop out, which deenergizes the motor. The motor with its inertia continues to turn, maintaining the counter E.M.F. and an increase of the potential at arm 57. The sum of the voltage of arm 58 and potentiometer 68 quickly exceeds the potential at arm 57 causing relay 61 to be energized. Energizing relay 61, circulates current through the motor in the decelerating direction causing the motor shaft 70 and connected inertial load 71 to decelerate at a constant rate as the inertial load 71 gives up the energy stored therein, indicated from point K to 1, curve H. Consider now curve M, FIG. 5, which is a plot of instantaneous voltage of the position of arm 58 of potentiometer 56, and hence is a plot of the instantaneous voltage at arm 58 as it is driven by shaft 70. Curve M is an integration of curve H. Dashed curve P represents the voltage selected on potentiometer 58 indicative of a new line speed. It will be seen that between time zero and time $t_1$ when the motor is accelerating at a constant rate, the rate of change of position of arm 58 on potentiometer 56 is gradually controlled to initiate at substantially zero slope with respect to time. From time $t_1$ to time $t_2$ when motor speed is constant the rate of change of position of arm 58 on potentiometer 56 is constant and from time $t_2$ to time $t_3$ when the motor speed decelerates at a constant rate, the rate of change of position of arm 58 on potentiometer 56 is again gradually controlled to terminate at the desired point at substantially zero slope with respect to time. The movement of arm 72 on potentiometer 73 is identically proportional to the movement of arm 58 on potentiometer 56, and therefore the voltage at arm 72 as it is driven on potentiometer 73 generates an accelerating control voltage with respect to time, as indicated by curve M. When the application of accelerating energy to a motor of an electrical drive, and hence accelerating forces to the load driven to the load driven by the motor, and also the removal of these accelerating forces is controlled, as indicated by curve M, the motor and load thereon is accelerated and brought up to a selected speed very smoothly, and the aforementioned discussed problems of rapid application and removal of accelerating forces to rollers driven by a motor are obviated. Or otherwise stated, the actual change in speed of the motor accurately follows the acceleration control signal.

Figure 7:
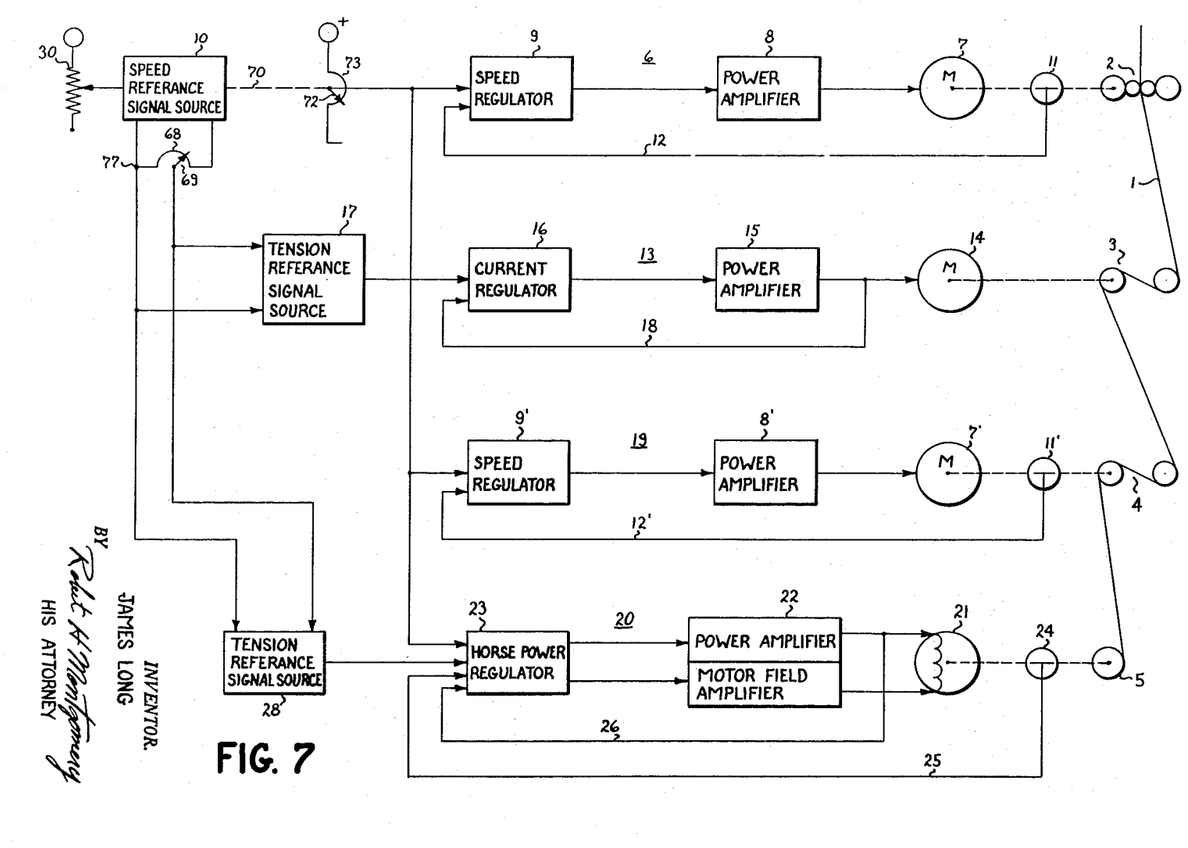
FIG. 7 illustrates partially in block form a coordinated electric drive system embodying the invention.

In accordance with the invention, the system of FIG. 1 may be improved by incorporation of the circuit of FIG. 4. FIG. 7 illustrates, partially in block form, a drive system incorporating the invention. In FIG. 7, like identifying numerals to those used in FIG. 1 identify like numerals.

In FIG. 7, the circuit of FIG. 4 is represented partially in block form by the speed reference signal source 10', and only potentiometer 73 and potentiometer 68, together with arm 69 and point 77, are otherwise illustrated for ease of orientation. As illustrated in FIG. 7, a predictive inertia compensation signal for electric drives 13 and 20 may be derived across point 77 and arm 69 of potentiometer 68. This inertia compensation signal will have a wave shape corresponding to curve H of FIG. 5, since curve H is a rate of change of speed reference signal, and hence is proportional to the form of acceleration energy desired to be applied to the non-speed regulated drive motors. This eliminates the necessity of rate circuit 32 of FIG. 1. It will further be seen that the trapezoidal shaped inertia compensation signal is a voltage such that it may be applied directly to the tension reference signal sources 17 and 28. The initial and final ramp function inertia compensation signal having the wave shape of curve H will then supply at a controlled time rate such that the regulators 16 and 23 of motors 14 and 21 will be able to apply through the motors the proper accelerating energy to bring the rolling stations 3 and 5 up to speed as the tension exerted by these rolling stations on the strip material 1 is regulated to the desired value. It will be seen that the controlled speed acceleration signal is applied to speed regulated drives 6 and 19 at the same time the inertia compensation signals are applied to tension regulated drives 13 and 20. Therefore, the rolling stations will accelerate in coordination. The rollers 3 will then maintain the regulated tension in strip 1 as it is pulled from the mill 2 and the center driven reel 5 will maintain constant tension in the strip as it pulled from the cooling rollers 4. Therefore, there would be no looping or over-tensioning of the strip material 1. The major factor in providing coordinated acceleration of the electric drives is the controlled application and removal of the accelerating energy supplied by these drives to their respective rollers.

In FIG. 4 the invention is illustrated in a shaft positioning integrating arrangement; however, the invention is not limited to such an embodiment and may take various and divers forms. For example, in FIG. 6 is illustrated a static acceleration control circuit, and in the following explanation of this circuit analogous functioning to the circuit of FIG. 4 will be apparent.

FIG. 6 may best be presented by first describing various component circuit loops thereof. A first loop comprises voltage source 78 and potentiometer 79 connected across lines 80 and 81. Potentiometer 79 has movable contact arm 82 thereon. Another loop comprises voltage source 78 and transistor 83 and resistor 84 serially connected across lines 80 and 81. Transistor 83 has base, emitter and collector electrodes 85, 86 and 87 respectively. Another loop comprises a center-tapped voltage source illustrated as comprising batteries 88 and 89 and potentiometers 90 and 91 connected thereacross by means of lines 92 and 93. Transistor 94 having base, emitter and collector electrodes 95, 96, and 97 respectively in series with resistor 99 connected across lines 92 and 93 provide with batteries 88 and 89 another loop. Resistance 100 and capacitor 101 provide a basic integrating circuit with transistor 83. Another integrating circuit comprises resistance 102 and 102' and capacitor 103 connected between base 95 of transistor 94 and line 104. A source of voltage indicated as transformer 105 having a primary winding 106 connected to an alternating voltage source, not shown, supplies a signal of predetermined but selectable magnitude to be integrated. The charging circuit of capacitor 103 may be traced from transformer secondary winding 107, resistance 102, diode bridge 108, specifically diode 109, capacitor 103, line 104, battery 89, line 93, resistance 99 and return to secondary winding 107. The discharge path of capacitor 103 may be traced from plate 103a, diode 112, resistance 102', winding 107, resistance 99, battery 89 and line 104. Line 104 also provides a feedback path from point 113, which together with point 114 provides voltage output terminals across resistance 84, over line 104 to capacitor 101.

The potentiometer 79 provides a line velocity selection signal source and may be considered analogous to potentiometers 30, 38 and 55 of FIGS. 1, 2 and 4, respectively. The diode bridge 108 senses any difference in voltage at plate 103a of capacitor 103 and arm 82. The transistors 83 and 94 are initially biased Class A so that they may provide output voltage changes in either direction.

Assume that the bridge 108 is balanced and there is no charge on capacitance 103, the voltage across transistor 94 is essentially zero, all of the voltage appears across resistance 99, the input to base 85 of transistor 83 is thus zero and the output voltage across resistance 84 is essentially zero. Assume now that it is desired to supply an accelerating control signal to an electrical drive or to a plurality of coordinated electrical drives, as illustrated in FIG. 1, and the arm 82 is moved on potentiometer 79 to select a voltage indicative of a new line speed. The voltage at arm 82 will then depart from equivalency with the voltage at plate 103a of capacitor 103. Further assume that the change of position of arm 82 was such that to increase the voltage thereat to positively accelerate the processing line. Points 115 and 116 of bridge 108 become unbalanced with respect to potential thereof, and a current will flow from winding 107 through resistance 102, diode 109, into plate 103a of capacitor 103. The complete charging circuit of capacitor 103 was previously traced. However, it should be noted that the resistances 102 and 102′ are made substantially greater than other resistances in this charging circuit so that the value of this resistance together with the value of capacitor 103 establish the time constant of this RC circuit. Inasmuch as the transformer 105 is selected to supply a constant voltage and resistance 102 is made large, a constant charging current will flow into plate 103a of capacitor 103. It may be thus seen that the diode bridge 108 is analogous to the current-sensing relays of FIGS. 2 and 4. As the constant current flows into plate 103a, the voltage thereacross will increase at a linear rate, increasing the bias on base 95 of transistor 94 at the same linear rate. Inasmuch as it may be seen that transistor 94 is of the PNP type, the impedance of transistor 94 will be increased and the voltage at emitter 96 will linearly increase. This linear increase in voltage may be represented by the segment $Oi$ of curve H, FIG. 5. The linearly increasing signal appearing at the emitter 96 of transistor 94 will cause current to flow into capacitor 101 through charging resistance 100 charging capacitor 101 positively with respect to line 81. The voltage across capacitance 101 will then build up as shown by segment $On$ of curve M of FIG. 5, and the voltage appearing at point 113 in the emitter circuit of transistor 83 will follow the buildup of voltage across capacitor 101.

As the voltage across capacitor 103 approaches that set on arm 90a of potentiometer 90 with respect to line 104, diode 119 conducts limiting the voltage from any further increase. The emitter voltage of transistor 94 will now be constant, providing a constant charging current for capacitor 101 through resistor 100. Thus, the output voltage continues to increase; however, now as a linear function of time, as indicated by the segment $np$ between times $t_1$ and $t_2$, it will be noted that by virtue of the feedback connection of point 113 over line 104 to capacitor 103 that the output voltage appearing across resistor 84 and the voltage across capacitor 103 are in series, and it will further be seen that as the voltages across the elements of this series circuit reaches the voltage between arm 82 of potentiometer 79 and line 81, the bridge 108 will become balanced. However, by virtue of the charge on capacitor 103, a voltage will still appear at the emitter 96 of transistor 94 which will cause a charging current to continue to flow through resistance 100 into capacitor 101, and the output across resistor 84 will continue to increase, but at a linear rate. The total voltage across resistor 84 and capacitor 103 will increase and exceed the voltage between arm 82 and line 81. The diode bridge will become unbalanced in the opposite direction and capacitor 103 will then commence to discharge through diode 112, resistance 102′, which is made equal to resistance 102, to provide the same charging and discharging rate for capacitor 103. As capacitor 103 discharges through diode 112 and resistance 103, the voltage at the base 95 of transistor 94 decreases, thereby decreasing the impedance of the emitter 96-collector 97 circuit of transistor 94 and the voltage at emitter 96 decreases at a linear rate following the decrease in voltage across capacitor 101. The decrease in voltage at emitter 96 may be represented by the segment $k1$ of curve H between time $t_2$ and time $t_3$ in FIG. 5. As the voltage at emitter 96 decreases, the rate of current flow into capacitor 101 decreases at a linear rate, and therefore the voltage appearing at the base 85 of transistor 83 increases the emitter 86-collector 87 circuit impedance of transistor 83 at a constant rate of change following the rate of change of current flowing into capacitor 101 through resistance 100. The rate of change of voltage across resistance 84 therefore decreases at a constant rate until it reaches a value equal to the setting of arm 82 on potentiometer 79. The various circuit parameters are chosen such that as the voltage across resistor 84 approaches the voltage across potentiometer 79, the voltage across capacitor 103 approaches zero. The result is the diode bridge 108 again balances, but with no voltage across capacitor 103, the emitter 96 of transistor 94 will also be at essentially zero potential and hence no charging current will flow through resistor 100 into capacitor 101 allowing the voltage across resistor 84 to remain constant.

The decrease in rate of change of voltage across resistor 84 may be represented by segment $pq$ of curve M of FIG. 5. It may be seen that the voltage output of the circuit of FIG. 6 will correspond in value with respect to time to that of the output voltage at the arm 72 of potentiometer 73 of FIG. 4, and when this output signal is utilized as an acceleration control signal it may be seen that it is initiated and terminated at essentially zero slope with respect to time, and therefore would control constant rates of applications of accelerating energy to the motor of an electric drive and the load driven thereby. In FIG. 6 I illustrate the acceleration control signal generating circuit as having a voltage output. However, by virtue of the switch 117, point 117a on the positive side of resistance 84 may be connected to point 118 to provide an output current having the same shape as depicted by curve M for application to current-operated devices such as a magnetic amplifier. Reference is again made to the potentiometers 90 and 91 and diodes 119 and 120 connected to their respective contact arms 90a and 90b. The diodes 119 and 120 are connected front to back to point 121 common to base 95 of transistor 94. The potentiometer and diode arrangement provides a clamp on base 95 to prevent it from going more positive than arm 90a, or more negative than arm 90b. This arrangement serves the same purpose as the diode 75 and variable contact 74 of FIG. 4, i.e., it limits the magnitudes to which capacitor 103 will charge and discharge, and therefore determines when the accelerating signal changes from one of constant rate of change to one of linear change, as represented by the points $n$ and $p$ of FIG. 5.

It will be further noted that the voltage appearing at emitter 96 will be either zero, linearly increasing, constant, or linearly decreasing. Therefore, when the circuit of FIG. 6 is generating an acceleration control signal, the voltage appearing between emitter 96 and line 104 will produce a signal having the shape of curve H of FIG. 5 and this signal may be taken off as indicated by the lines 122 to provide an inertia compensation signal to be used in the same manner as described in connection with the signal taken off between point 77 and arm 69 in FIG. 4. The foregoing description of FIG. 6 has assumed that when there is zero voltage across capacitor 101, there would be zero output across resistance 84 inasmuch as in that condition the transistors 83 and 94 do have a small finite impedance when conducting; therefore, I may provide a biasing circuit comprising a resistor 123 and voltage source 124 to make the potential at point 113 zero when there is zero voltage between arm 82 of potentiometer 79 and point 116.

The circuit of FIG. 6 has been shown in very simple form to facilitate explanation of embodiment of the invention in a static acceleration control circuit. In practice the circuit of FIG. 6 would be varied in accordance with the accuracy required and the environment in which it was to be used. For example, the integrating circuits may be more sophisticated and use more elements to insure the desired performance. Further, the voltage sources which have been indicated by batteries may comprise alternating voltage sources together with appropriate rectifying and filtering elements to provide direct current voltage of selected values.

It has been explained that the initiating and terminating portions of the acceleration control signal represented by curve M, FIG. 5, are the integrals of the leading and trailing edges of curve H, while the segment $np$ of curve M is the integral of the constant value segment of $de$ of curve H. Since the integrating time is substantially longer than any time constants in electric drive circuit components which will be encountered by the accelerating signal, the electric drive circuit will accurately produce and apply accelerating energy to its drive motor and load thereon in accordance with the accelerating signal. Thus, application and removal of accelerating energy to inertial loads will be made at rates which the loads can absorb in the time the accelerating energy is applied.

It might appear at first consideration that the slower constant rate of application and removal of accelerating energy would require more time to accelerate electric drive motors to selected speeds; however, consideration of curve M of FIG. 5 will show the reserve to be true. In utilizing the present invention the slope of segment $np$ of curve M may be increased, thus decreasing the interval of time required by curve M to reach point $q$. This can be accomplished in the circuit of FIG. 4 by increasing the maximum speed of potentiometer motor M or in the circuit of FIG. 6 by increasing the voltage of the capacitor-charging current source. The curve M would still have essentially the same initiating and terminating portions $On$ and $pq$ respectively; however, the linear portion $np$ would then have a steeper slope. A steeper slope of the linear portion of the accelerating signal would not be adversely affected by the electric drive circuit time constants inasmuch as the time constants offer delay in responding to and distort signals having non-linear rapid rates of change in small time intervals and do not substantially affect a signal because of rapid linear change in magnitude in small time intervals.

The inertia compensation signal derivable directly from a dynamoelectric machine speed reference circuit embodying the invention is seen to have ramp function leading and trailing edges, as represented by curve H, FIG. 5. These ramp function edges provide a timed application of accelerating energy to non-speed regulated electric drives which are not as subject to delay and distortion as the conventional step function inertia compensation signal derived from an inertia compensation circuit such as rate circuit 32, FIG. 1, or if taken across the armature of the potentiometer motor of FIG. 2. Furthermore, the inertia compensation signal generated by embodiments of this invention has the advantage of being predictive, and in conjunction with the generated acceleration control signal, act to cause accelerating energy to be applied to non-speed regulating drives, as well as speed regulating drives in a plurality of coordinated electric drives simultaneously to coordinate acceleration thereof.

It is to be understood that the invention may be advantageously utilized in applications requiring but single electric drives where accurate control of application and removal of accelerating energy to a driven load is required. One example is where a speed regulated motor drives an inertial load through a relatively long shaft and torsional stresses on the shaft must be limited.

From the discussion of one environment in which the invention will find application and a typical example of the prior art, no inference should be made that the invention is limited to such environment, or that the circuit of FIG. 3 is totally indicative of known motor acceleration timing circuits. The system of FIG. 1 is illustrated and discussed mainly for purposes of orientation and illustrates only a portion of a roller processing line, inasmuch as other roller stations would most likely be located prior to rolling mill 2. Another form of linear time acceleration circuits is disclosed and claimed in the copending application of W. R. Miller and James Long, Serial No. 767,189, filed October 14, 1958, now Patent 2,982,907, assigned to the same assignee as the present invention.

In disclosing the invention in conjunction with FIGS. 4 and 5, and further in discussing typical prior art structures, the various examples have been discussed only from the standpoint of an increasing acceleration control signal to increase the speed of a motor and its load. However, the operation of the examples discussed when a negative acceleration or deceleration signal is to be generated is merely the reverse of that described when positive acceleration is assumed. Furthermore, throughout the application use of the term "acceleration" refers to change in speed without regard to direction of change, and therefore the term "acceleration" also includes negative acceleration or deceleration. The examples disclosed herein to teach the invention are given for purposes of disclosure, and the invention is not limited to embodiment in the particular circuits disclosed.

Throughout the application general discussion has been made of electric regulated drives and regulators therefor. Those skilled in the art are familiar with such terms. The various motor characteristic regulators may utilize appropriate circuit elements such as vacuum tubes, transistors, magnetic amplifiers, etc. The power amplifiers may be any device capable of controlling application of electric energy such as gaseous or liquid pool discharge tubes, magnetic amplifiers, silicon controlled rectifiers, or rotating amplifiers such as direct current generators. By way of example only, a speed regulated drive utilizing a transistor preamplifier regulator and magnetic power amplifier is disclosed in the copending application of Richard W. Wolke and Ernest F. Kubler, Serial No. 847,925, filed October 22, 1959, now Patent 3,026,463, assigned to the same assignee as the present invention. Reference may also be made to the copending application of William R. Miller and James Long, Serial No. 737,436, filed May 23, 1958, now Patent 3,032,698, assigned to the same assignee as the present invention, for a general discussion of the characteristics of regulated drives for direct current motors.

While embodiments of the invention and modifications thereof have been selected for purposes of disclosure, other embodiments and modifications of the disclosed invention may occur to those skilled in the art which do not depart from the spirit and scope of the invention. Accordingly, it is intended to cover all modifications of the invention and changes in the illustrations which were chosen for purposes of disclosure which do not constitute departure from the spirit and scope of the invention.

What I claim as new and desire to secure by Letters Patent of the United States is:

1. In combination with a dynamoelectric machine adapted to drive a load, means for supplying controlled electric energy to said machine, regulating means for regulating the speed of said dynamoelectric machine by controlling the power supply means in response to a speed reference input signal, means for selecting a signal indicative in magnitude of a desired speed of said machine, and means responsive to change in magnitude of said selected signal for providing an acceleration control signal to said regulating means to supply accelerating energy to said machine comprising circuit means for integrating a constant reference signal to provide a first signal varying at a linear rate with respect to time, means for obtaining the negative integral of said constant reference signal after a time interval predetermined by the magnitude of change of said selected signal to provide a second signal varying at an equal but opposite linear rate with respect to said first signal and of equal time duration to said first signal to thereby provide an acceleration reference signal having equal but opposite leading and trailing edges, means for integrating said acceleration reference signal to provide an acceleration control signal initiating and terminating at substantially constant change of rate of change, the time of integration of said acceleration reference signal being substantially longer than any time constants of said regulating means, and means for applying said acceleration control signal to said regulating means to cause accelerating energy to be applied to and removed from said machine at a substantially constant rate of change to smoothly change the speed of said machine to the value selected by said speed selecting means.

2. In combination with a dynamoelectric machine adapted to drive a load, means for supplying controlled electric energy to said machine, regulating means for regulating the speed of said dynamoelectric machine by controlling the power supply means in response to a speed reference input signal, means for selecting a signal indicative in magnitude of a desired speed of said machine, and means responsive to change in magnitude of said selected signal for providing an acceleration control signal to said regulating means to supply accelerating energy to said machine comprising circuit means for integrating a constant reference signal to provide a first signal varying at a linear rate with respect to time, means for limiting the magnitude of said first signal, means for obtaining the negative integral of said constant reference signal after a time interval predetermined by the magnitude of change of said selected signal to provide a second signal varying at an equal but opposite linear rate with respect to said first signal to thereby provide an acceleration reference, a signal having equal but opposite leading and trailing edges, means for integrating said acceleration reference signal to provide an acceleration control signal initiating and terminating at substantially constant change of rate of change, the time of integration of said acceleration reference signal being substantially greater than any time constants of said regulating means, and means for applying said acceleration control signal to said regulating means to cause accelerating energy to be applied to and removed from said machine at a substantially constant rate of change and applied at a linear rate therebetween to smoothly change the speed of said machine to the value selected by said speed selecting means.

3. In combination with a dynamoelectric machine adapted to drive a load, means for supplying controlled electric energy to said machine, regulating means for regulating the speed of said dynamoelectric machine by controlling the power supply means in response to a speed reference input signal, means for selecting a signal indicative in magnitude of a desired speed of said machine, and means responsive to change in magnitude of said selected signal for providing a speed reference and acceleration control signal to said regulating means to supply accelerating energy to said machine comprising circuit means for integrating a constant reference signal to provide a signal varying at a predetermined linear rate with respect to time, means for limiting the magnitude of said linearly varying signal to provide a ramp function acceleration reference signal, means for integrating said acceleration reference signal to provide an acceleration control signal initiating at a substantially constant changing rate of change and increasing toward a speed reference value determined by said selecting means at a linear rate, the time of integration of said acceleration reference signal being substantially greater than any time constants of said regulating means, and means for applying said acceleration control signal to said regulating means to cause accelerating energy to be applied to said machine at a substantially constant rate of change and increase said motor speed toward the value selected by said selecting means at a linear rate to smoothly change the speed of said machine toward the value selected by said speed selecting means.

4. In combination with a dynamoelectric machine adapted to drive a load, means for supplying controlled electric energy to said machine, regulating means for regulating the speed of said dynamoelectric machine by controlling the power supply means in response to a speed reference input signal, means for selecting a signal indicative in magnitude of a desired speed of said machine, means responsive to change in magnitude of said selected signal for providing a speed reference and acceleration control signal to said regulating means to supply accelerating energy to said machine comprising circuit means for integrating a constant reference signal to provide an increasing signal, means for limiting the magnitude of said integrated signal to provide a second signal of constant predetermined magnitude, means for obtaining the negative integral of said constant reference signal after a time interval predetermined by the magnitude of change of said selecting signal to provide an acceleration reference signal having a predetermined timed ramp function trailing edge, means for integrating said acceleration reference signal to provide an acceleration control signal increasing at a timed linear rate, varying therefrom and terminating at the selected speed reference signal value at a constant decreasing rate of increase, the time of integration of said acceleration reference signal being substantially greater than any time constants of said regulating means, and means for applying said accelerating control signal to said regulating means to cause accelerating energy to be applied to said machine at a linear rate as it is accelerated and to vary in application to said machine at a constantly decreasing rate of increase to smoothly change the speed of said machine to the value selected by said speed selecting means.

5. For use in a material processing line wherein strip material is driven by roller stations having rollers arranged to perform operations on the strip material, including a first strip material speed regulating roller station and a second strip material tension regulating roller station: a first electric drive having a drive motor and regulating means for controlling the electric energy supplied thereto for driving the first roller station rollers at a regulated speed, a second electric drive having a drive motor and tension regulating means for controlling the electric energy supplied thereto for driving the second roller station rollers at the regulated speed while regulating to a selected value the tension exerted on the strip material by the second roller station; a strip material velocity selecting control providing for selection of a velocity reference signal of magnitude indicative of a desired velocity of said strip material including an electric drive speed reference and acceleration control circuit means responsive to change in magnitude of the selected velocity reference signal for developing an acceleration reference signal having equal but opposite slope linear leading and trailing edges with respect to time, a time duration determined by the change in magnitude of said selected signal, and being proportional to the energy required to accelerate said drives to said selected speed; means responsive to development of said acceleration reference signal for generating an accelerating control signal to control acceleration of said speed regulating drive motor, comprising means for integrating said acceleration reference signal with respect to time, said integration occurring over an interval of time substantially greater than any time constant of said speed regulating drive to thereby provide an accelerating control signal having an initial constant rate of change of increase and a terminating constant rate of change of decrease as the accelerating signal establishes a new speed reference signal; means for applying said acceleration control signal to said speed regulating means to cause application and removal of accelerating energy to said speed regulated drive motor at a constant rate of change, and means for simultaneously applying said acceleration reference signal to said tension regulating means to cause application and removal of accelerating energy to said tension regulating motor at a linear rate to coordinate acceleration of said drives to said selected strip material velocity.

6. For use in a material processing line wherein strip material is driven by roller stations having rollers arranged to perform operations on the strip material, including a first strip material speed regulating roller station and a second strip material tension regulating roller station; a first electric drive having a drive motor and regulating means for controlling the electric energy supplied thereto for driving the first roller station rollers at a regulated speed, a second electric drive having a drive motor and tension regulating means for controlling the electric energy supplied thereto for driving the second roller station rollers at the regulated speed while regulating to a selected value the tension exerted on the strip material by the second roller station; a strip material velocity selecting control providing for selection of a velocity reference signal of magnitude indicative of a desired velocity of said strip material including electric drive speed reference and acceleration control circuit means responsive to change in magnitude of the selected velocity reference signal for developing an acceleration reference signal having equal but opposite slope linear leading and trailing edges with respect to time, a time duration determined by the change in magnitude of said selected signal, and being proportional to the energy required to accelerate said drives to said selected speed, means for limiting the magnitude of said acceleration reference signal, means responsive to development of said acceleration reference signal for generating an accelerating control signal to control acceleration of said speed regulating drive motor, comprising means for integrating said acceleration reference signal with respect to time, said integration occurring over an interval of time substantially greater than any time constant of said speed regulating drive to thereby provide an accelerating control signal having an initial constant rate of change of increase and a terminating constant rate of change of decrease as the accelerating signal establishes a new speed reference signal; means for applying said acceleration control signal to said speed regulating means to cause application and removal of accelerating energy to said speed regulated drive motor at a constant rate of change and at a linear rate therebetween, and means for simultaneously applying said acceleration reference signal to said tension regulating means to cause application and removal of accelerating energy to said tension regulating motor at a linear rate to coordinate acceleration of said drives to said selected strip material velocity, the time of duration of said acceleration control and reference signals being determined by the magnitude to which the acceleration reference signal was limited.

7. An electric circuit for providing a speed reference and acceleration control signal to control the speed and acceleration of an electric drive comprising an electric motor and regulating means for supplying regulated electric energy to said motor to regulate the speed thereof, comprising means providing a first reference signal having a magnitude selectable in accordance with a desired speed of said motor, balancing means for detecting a change in magnitude of said first reference signal, means responsive to detection of magnitude change in said first reference signal for providing a second reference signal of constant predetermined magnitude, means for integrating with respect to time said second reference signal to derive an integrated signal varying at a linear rate with respect to time, means for limiting the magnitude of said integrated signal, means for obtaining the negative integral of said second reference signal with respect to time to provide an acceleration reference signal having equal but opposite leading and trailing edges with respect to time, means for integrating with respect to time said acceleration reference signal to provide an acceleration control signal, said integration occurring over an interval of time substantially greater than any time constant of the regulating means, said acceleration control signal initiating at a constant increasing rate of change terminating at a constant decreasing rate of change and having a linear rate of change therebetween, the time duration of the initiating and terminating portion of said acceleration control signal being determined by the magnitude of said second reference signal and the rate of change of the linearly varying portion being determined by the limiting magnitude placed on said acceleration reference signal, and feedback means for re-balancing said balancing means when said acceleration control signal reaches the magnitude selected by said first reference signal.

8. The circuit of claim 7 wherein the first reference signal is provided by a potentiometer adapted to be connected across a voltage source and having a variable contact arm thereon, the balancing means comprises a second substantially identical potentiometer adapted to be connected across the same voltage source and having a variable contact arm thereon and current sensing means connected between said arms, said second potentiometer contact arm being connected to and driven by a separately excited direct current motor having inertia of magnitude sufficient to constitute the primary factor in absorbing motor torque, the second reference signal comprises a constant current source adapted to be connected across said motor when said current sensing means is energized and said means for limiting the magnitude of the acceleration reference signal comprises means for limiting the current magnitude of said constant current source.

9. In a dynamoelectric machine speed control system in which a speed reference signal is applied to a control for determining a preselected regulated speed in said system, means for generating an acceleration control signal responsive to changes in said speed reference signal comprising means for generating an acceleration reference signal the integrated value of which with respect to time is directly proportional to the magnitude of the change in said speed reference signal and the leading and trailing edges of which vary at equal but opposite linear rates with respect to time, and means for integrating said acceleration reference signal with respect to time to derive said acceleration control signal.

10. In a dynamoelectric machine speed control system in which a speed reference signal is applied to a control for determining a preselected regulated speed in said system, means for generating an acceleration control signal responsive to changes in said speed reference signal comprising means for generating a signal having a preselected constant amplitude, means for integrating said constant amplitude signal to derive a first signal varying at a linear rate with respect to time and forming the initial portion of an acceleration reference signal, means for deriving the negative integral of said constant amplitude signal to produce a second signal varying at an equal but opposite linear rate with respect to said first signal and forming the terminal portion of said acceleration reference signal, whereby the leading and trailing edges of said acceleration reference signal are formed respectively by said first and second signals, and means for integrating said acceleration reference signal to derive said acceleration control signal.

11. In a material processing line wherein strip material is driven by roller stations and including at least one motor driven speed regulated station and at least one motor driven tension regulated station, means for controlling said tension and speed regulated stations in response to a change in a speed reference signal calling for a change in the speed of the system comprising means for generating an acceleration reference signal the integrated value of which with respect to time is directly proportional to the magnitude of the change in said speed reference signal and the leading and trailing edges of which vary at equal but opposite linear rates with respect to time, means for integrating said acceleration reference signal with respect to time to derive an acceleration control signal, means for adjusting the energy supplied to said tension regulated station in response to said acceleration reference signal, and means for adjusting the energy supplied to said speed regulated station in response to said acceleration control signal.

References Cited by the Examiner

UNITED STATES PATENTS

| | | | |
|---|---|---|---|
| 2,467,381 | 4/49 | Hawkins | 318—6 X |
| 2,504,155 | 4/50 | Roman | 318—6 |
| 2,600,308 | 6/52 | Lund et al. | 318—158 |
| 2,715,703 | 8/55 | Winchester | 318—7 |
| 2,858,493 | 10/58 | Hull et al. | 318—6 X |

FOREIGN PATENTS 820,561  9/59  Great Britain.

ORIS L. RADER, *Primary Examiner.*